United States Patent
Konopacki et al.

(10) Patent No.: US 10,336,482 B2
(45) Date of Patent: Jul. 2, 2019

(54) SYSTEM, METHOD AND APPARATUS FOR PRESERVING AND CAPPING TUBES

(71) Applicant: GENERAL ELECTRIC TECHNOLOGY GMBH, Baden (CH)

(72) Inventors: Ronald Francis Konopacki, Windsor, CT (US); Allan Gunn Ferry, Windsor, CT (US)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 197 days.

(21) Appl. No.: 15/331,017

(22) Filed: Oct. 21, 2016

(65) Prior Publication Data

US 2018/0111708 A1 Apr. 26, 2018

(51) Int. Cl.
*B65B 7/28* (2006.01)
*B65B 53/06* (2006.01)
(Continued)

(52) U.S. Cl.
CPC ............ *B65B 7/2885* (2013.01); *B23P 15/26* (2013.01); *B29C 63/42* (2013.01); *B29C 66/536* (2013.01); *B65B 3/14* (2013.01); *B65B 39/00* (2013.01); *B65B 53/02* (2013.01); *B65B 53/06* (2013.01); *B65B 53/066* (2013.01); *B65B 65/00* (2013.01); *B29C 63/0056* (2013.01); *Y10T 29/49391* (2015.01); *Y10T 29/49865* (2015.01);
(Continued)

(58) Field of Classification Search
CPC ..... B65B 7/2885; B65B 53/02–53/066; B65B 7/28–7/2878; B65B 7/2892; Y10T 29/4935–49393; Y10T 29/53113–53122; Y10T 29/5199; Y10T 29/5137; Y10T 29/53987; B23P 15/26; B23P 2700/09
USPC ................. 53/557, 281; 29/890.03–890.054, 29/726–727, 33 T, 564.1, 282; 431/344
See application file for complete search history.

(56) References Cited

U.S. PATENT DOCUMENTS 3,628,301 A * 12/1971 Vermeulen ............... B29C 65/18
206/497
3,779,694 A * 12/1973 Zagoroff ................. B65B 53/06
431/347
(Continued)

FOREIGN PATENT DOCUMENTS

DE 4304680 C1 4/1994
DE 10 2004 016234 A1 12/2004
(Continued)

OTHER PUBLICATIONS

International Search Report and Written Opinion issued in connection with corresponding PCT Application No. PCT/EP2017/076737 dated Jan. 23, 2018.
(Continued)

*Primary Examiner* — Erica E Cadugan
(74) *Attorney, Agent, or Firm* — Grogan, Tuccillo & Vanderleeden, LLP

(57) ABSTRACT

A system for preserving and capping tubes includes a compressed air reservoir for storing compressed air, a preservative reservoir containing a supply of a preservative, a nozzle in fluid communication with the compressed air reservoir and the preservative reservoir for injecting the preservative into the interior of a tube, and a capping device configured to insert a cap onto the end of the tube.

17 Claims, 6 Drawing Sheets

(51) Int. Cl.
   *B65B 65/00*      (2006.01)
   *B23P 15/26*      (2006.01)
   *B65B 3/14*       (2006.01)
   *B65B 39/00*      (2006.01)
   *B65B 53/02*      (2006.01)
   *B29C 65/00*      (2006.01)
   *B29C 63/42*      (2006.01)
   *B29C 63/00*      (2006.01)

(52) U.S. Cl.
   CPC ........ *Y10T 29/5137* (2015.01); *Y10T 29/5199* (2015.01); *Y10T 29/53987* (2015.01)

(56) References Cited

U.S. PATENT DOCUMENTS

| | | | | |
|---|---|---|---|---|
| 3,849,971 | A | * | 11/1974 | Granseus .............. B29C 65/10 53/329.2 |
| 4,106,171 | A | * | 8/1978 | Basiulis ................ F16L 55/10 165/104.21 |
| 4,429,719 | A | * | 2/1984 | Mosing ................ B65D 59/06 138/89 |
| 4,801,159 | A | | 1/1989 | Sehorn |
| 5,722,562 | A | * | 3/1998 | Kick ................. B65D 43/0218 215/320 |
| 9,925,648 | B2 | * | 3/2018 | McLaughlin ........... B23P 19/06 |
| 2002/0077767 | A1 | | 6/2002 | Terashima et al. |
| 2011/0008557 | A1 | * | 1/2011 | Zeyfang ................ B65D 59/06 428/36.8 |

FOREIGN PATENT DOCUMENTS

| | | | |
|---|---|---|---|
| RU | 2072700 | C1 * | 1/1997 |
| SU | 611684 | A  * | 5/1978 |
| SU | 1696811 | A1 * | 12/1991 |

OTHER PUBLICATIONS

Konopacki, R.F. et al., System, method and apparatus for locating the position of a component for use in a manufacturing operation, GE Co-Pending U.S. Appl. No. 15/286,910, filed Oct. 6, 2016.

Konopacki, R.F. et al., System and method for additively manufacturing boiler tubes, GE Co-Pending U.S. Appl. No. 15/331,046, filed Oct. 21, 2016.

Konopacki, R.F., System, method and apparatus for manufacturing boiler tubes, GE Co-Pending U.S. Appl. No. 15/335,867, filed Oct. 27, 2016.

\* cited by examiner

SYSTEM, METHOD AND APPARATUS FOR PRESERVING AND CAPPING TUBES

BACKGROUND

Technical Field

Embodiments of the invention relate generally to power generation systems and processes and, more particularly, to a system, method and apparatus for preserving and capping heat exchanger tubes for boilers.

Discussion of Art

Heat exchangers for industrial boilers, such as those used in power generation systems and processes, are typically manufactured with many miles of tubing purchased in standard lengths that are subsequently welded together and with various attachments, and bent to shape to form boiler tube assemblies. These tube assemblies each include a plurality of tubes that are machined with a weld preparation on the exposed ends of each such tube, which facilitates joining with other assemblies and components in the field to form a completed heat exchanger. Typically, after machining the weld preparations on the exposed ends of the tubes at a manufacturing facility, the tubes are preserved and capped in order to prevent weathering, rusting and/or incursion of debris during storage and shipment to the field, where ultimately the tube assemblies are positioned in place and final welds are made to form the heat exchangers.

Existing methods for preserving and capping the tubes for shipment are very labor intensive and require a number of individual steps that are performed manually. In particular, with existing methods, once the final fabrication steps are completed, namely, welding attachments onto the tubes, heat treating the tubes, subjecting the tubes to hydrostatic testing and performing final inspection to ensure there are no blockages, four separate manual steps are performed to preserve and cap the tube. First, a special preserving paint called deoxyaluminate is applied manually with a brush to the machined weld preparations on the exposed ends of the tubes. This is necessary because typical manually-applied caps can become dislodged during shipping or storage, exposing the machined weld preparation to weather which will then oxidize and rust and sometimes pit the surface, requiring extensive cleanup and even remachining before welding.

Next, after the paint is allowed to dry, a preservative and rust inhibitor such as, for example, VpCI 309 powder, a vapor phase corrosion inhibitor powder, is injected into the tube to keep the interior of the tube dry during shipment and storage. With existing methods, the powder is manually introduced into the open end of the tube using measuring spoons, utensils or funnels, and then blown into the tube with a low pressure air hose, often resulting in spillage.

Following coating of the interior of the tube with the rust inhibitor the, tubes are then closed and sealed. In particular, with existing methods, the deoxyaluminate painted tube ends are next sealed by a manual capping process where metal or plastic caps are installed by hand using a wooden mallet to secure them firmly to the end.

Finally, tape is then manually applied to the ends to secure and seal the caps to the tubes, rendering the tubes ready for final painting prior to shipment.

As indicated above, existing preservation and capping methods are particularly time consuming and laborious, requiring many separate manual steps. In view of the above, there is therefore a need for a system, method and apparatus for preserving and capping heat exchanger or other tubes that are more streamlined and less time consuming than existing methods.

BRIEF DESCRIPTION

In an embodiment, a system for preserving and capping tubes is provided. The system includes a compressed air reservoir for storing compressed air, a preservative reservoir containing a supply of a preservative, a nozzle in fluid communication with the compressed air reservoir and the preservative reservoir for injecting the preservative into the interior of a tube, and a capping device configured to insert a cap onto the end of the tube.

In another embodiment, an apparatus for preserving and capping boiler tubes is provided. The apparatus includes a mechanism for injecting a preservative into an interior of a tube, a mechanism for inserting a cap onto the end of the tube, and a heating device for heat shrinking the cap to an outer surface of the tube.

In yet another embodiment, a method for preserving and capping a tube is provided. The method includes the steps of placing a preservative injection nozzle in close association with an end of a tube, entraining a preservative with a supply of compressed air and injecting the preservative into the interior of the tube through the nozzle, arranging a capping device in close association with the end of the tube, pressing a cap onto the end of the tube with the capping device, and applying heat to the cap to heat shrink the cap to the outer surface of the tube.

DRAWINGS

The present invention will be better understood from reading the following description of non-limiting embodiments, with reference to the attached drawings, wherein below:

DETAILED DESCRIPTION

Figure 1:
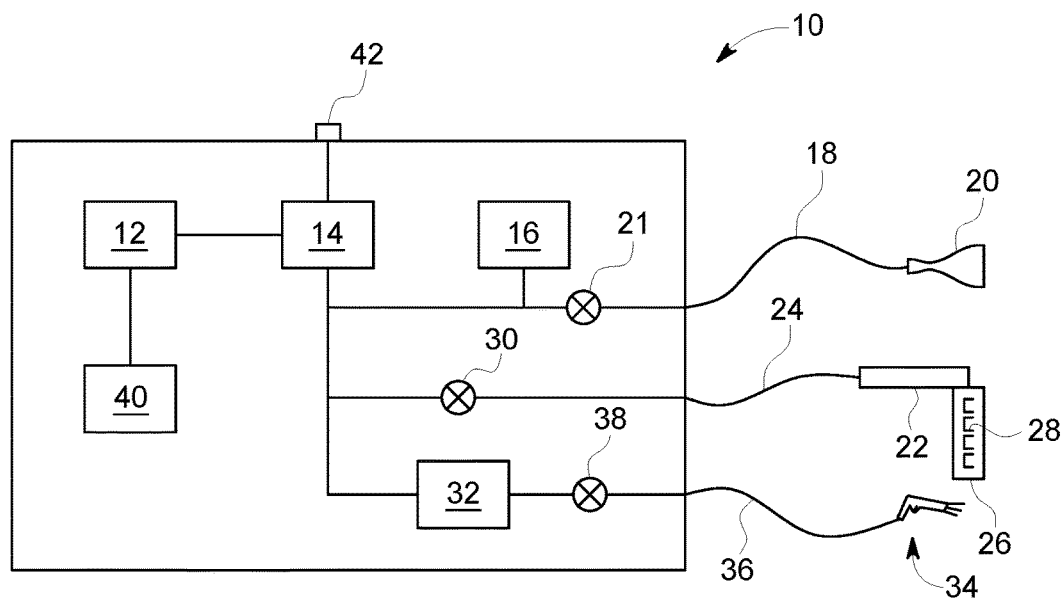
FIG. 1 is a schematic illustration of a system for preserving and capping tubes, according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in connection with preserving and capping tubes for heat exchangers of boilers, embodiments of the invention may also be applicable for preserving and capping other tubular components such as pipes, conduits and the like, regardless of end use.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer.

Embodiments of the invention relate to a system, method and apparatus for preserving and capping heat exchanger or other tubes. In an embodiment, the system includes three integrated subsystems for (1) injecting a preservative into the exposed end of a tube, (2) for inserting a cap onto the end of the tube, and (3) for sealing the cap to the end of the tube, respectively. The system provides a portable device providing for a level of automation heretofore not seen in the art, and eliminates the tedious, manual steps required with existing tube preservation and capping processes.

Referring to FIG. 1, a system 10 for preserving and capping tubes includes an air compressor 12 and a compressed air storage reservoir 14 fluidly coupled to the air compressor 12 for receiving compressed air therefrom and for storing the compressed air for later use, as discussed in detail hereinafter. The system 10 also includes a reservoir 16 containing a supply of a preservative (namely, a corrosion inhibitor) in powder or granular form. In an embodiment, the preservative may be VpCl 309 powder. As shown in FIG. 1, the compressed air storage reservoir 14 and the preservative reservoir 16 are fluidly coupled to a first discharge conduit 18 outfitted with a discharge nozzle 20. A trigger-actuated valve 21 may be positioned along the discharge line 18. In operation, a trigger associated with the discharge nozzle 20 may be depressed, causing the valve 21 to open. Air and preservative flow into the conduit 18 from the respective reservoirs 14, 16, causing the powder preservative to be entrained with the compressed air, which then exits the nozzle 20. In an embodiment, the reservoir 16 may include a valve (not shown) that is controllable to allow a predetermined or premeasured amount of powder to be syphoned from the reservoir 16. In an embodiment, the air compressor 12, compressed air storage reservoir 14, preservative powder reservoir 16, conduit 18 and nozzle 20 define a preservative injection subsystem of system 10.

In an embodiment, the reservoir 16 may be a refillable reservoir. In another embodiment, the reservoir 16 may include a replaceable canister filled with preservative/corrosion inhibiting powder.

As also shown in FIG. 1, the system 10 may further include a capping device 22 fluidly connected to the compressed air reservoir 14 via a second conduit 24 having a second valve 30 positioned therein. In an embodiment, the capping device 22 may include a pneumatic piston that is selectively extendable via depression of a trigger or similar actuator. The capping device 22 may also include a magazine 26 or similar feeding device for supplying caps 28 for ejection by the piston. In an embodiment, the caps 28 are made of a heat-shrinkable polymer or plastic. In operation, the capping device 22 may be placed in close proximity to the end of a tube. Depression of a trigger or actuator of the capping device 22 causes the valve 30 to open, allowing compressed air to flow through the conduit 24 to the capping device, actuating the pneumatic piston and pressing a cap 28 onto the open end of a tube. The air compressor 12, reservoir 14, conduit 24 and capping device 22 therefore define a capping subsystem for inserting a cap onto the end of the tube. While FIG. 1 illustrates a pneumatic capping device 22, it is envisioned that the capping device may instead be a mechanical or electrical insertion device.

As additionally illustrated in FIG. 1, in an embodiment, the system 10 may also include a heating subsystem for heat-shrinking the cap to the end of the tube once it is positioned on the end of a tube utilizing the capping device 22. For example, the heating system may include a heat source which, as illustrated in FIG. 1, may be a combustible fuel such as propane stored in tank or reservoir 32. The reservoir 32 is fluidly coupled to a nozzle 34 via a third conduit 36 having a third valve 38 positioned therein. In an embodiment, the nozzle 34 may include a spark ignition device that is actuatable by a user that both opens the valve 38 to allow the combustible fuel to flow from the reservoir 32 and out of the nozzle and ignites the fuel to produce a flame. In an embodiment, the nozzle may also be fluidly connected to the compressed air source 14. While FIG. 1 illustrates the use of propane as a heat source, the invention is not so limited in this regard. In particular, other heat sources are also envisioned, such as electric heating elements and the like. Regardless of the particular heat source utilized, the nozzle 34 may be coupled to the compressed air source 14 so that heat may be directed outwardly from the nozzle 34. In an embodiment, the fuel reservoir 32, nozzle 34, conduit 36 and spark ignition device define a heat-shrink subsystem for sealing the cap to the end of the tube.

In an embodiment, the system 10 may include a battery 40 or other energy storage device electrically connected to the air compressor 12 for powering the compressor 12. Moreover, while FIG. 1 illustrates an integrated air compressor 12, it is envisioned that other sources of compressed air may also be utilized for supplying compressed air to the system, for storage in storage reservoir 14. For example, the system 10 may include a port or connector 42 for connecting an external plant or factory airline to the storage reservoir 14 for filling the storage reservoir 14 with compressed air. In certain embodiments, the reservoir 14 may be prefilled, or be supplied with compressed air upon use. In yet other embodiments, the compressed air required for system operation may be supplied directly by an external air supply system, such as an external plant or factory airline. In addition, while FIG. 1 illustrates an on-board battery 40 for supplying power for system loads, it is envisioned that the battery 40 may be omitted and power supplied instead by an external power cord.

Figure 2:
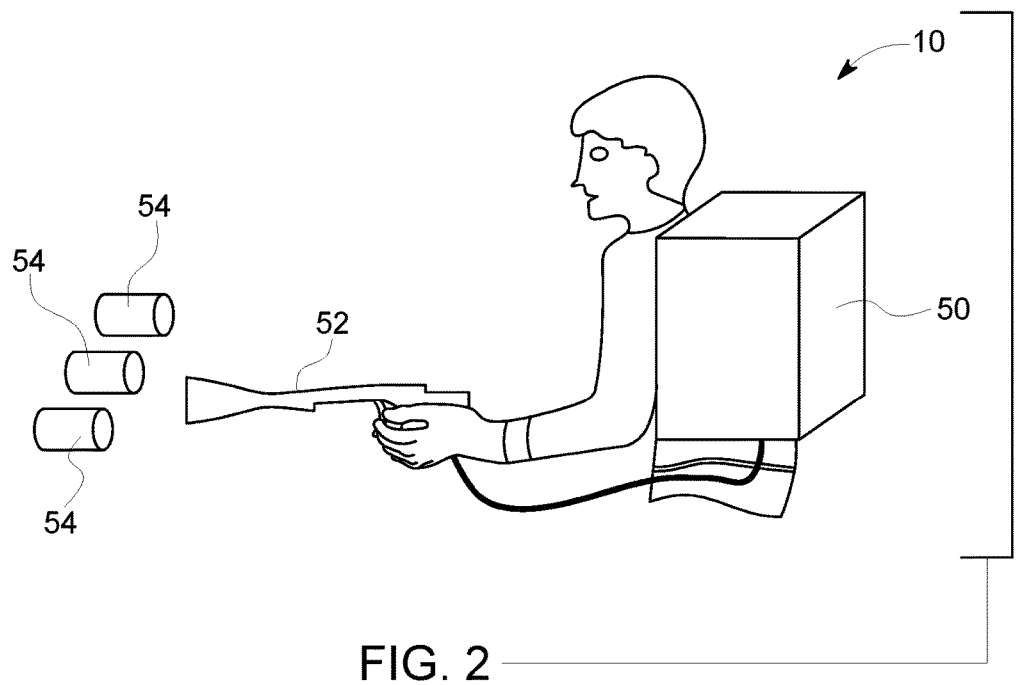
FIG. 2 is a perspective view of the system of FIG. 1, embodied in a wearable pack.
Figure 3:
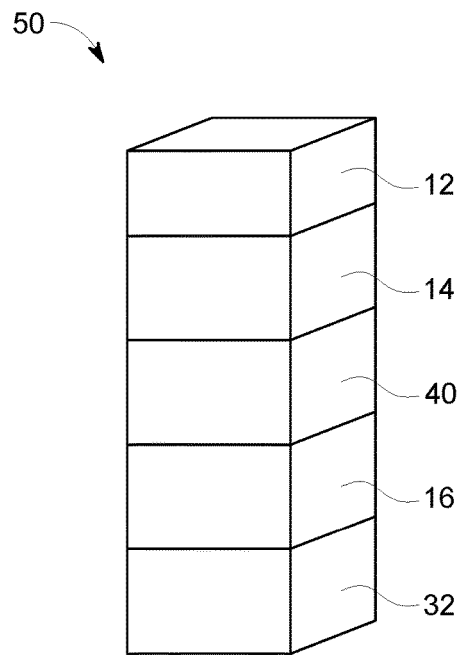
FIG. 3 is a simplified, schematic illustration of the functional modules of the wearable pack of FIG. 2.

Turning now to FIG. 2, in an embodiment the system 10 may be integrated into a man-wearable backpack 50. While it is contemplated that three separate nozzles 20, 22, 34 may be utilized for applying the preservative, inserting the end cap, and heat shrinking the end cap to the tube, the functionality of the nozzles may instead be combined into a single, multi-function nozzle 52, as illustrated in FIG. 2. As shown in FIG. 3, the backpack 50 includes a plurality of stacked modules, including an air compressor module 12, an air storage module 14, a battery 40, a preservative storage module 16 and a heater module (e.g., a propane tank) 32. The modules are fluidly connected to one or more conduits and nozzles for preservative injection, cap insertion, and cap sealing, as discussed above in connection with FIG. 1.

Figure 4:
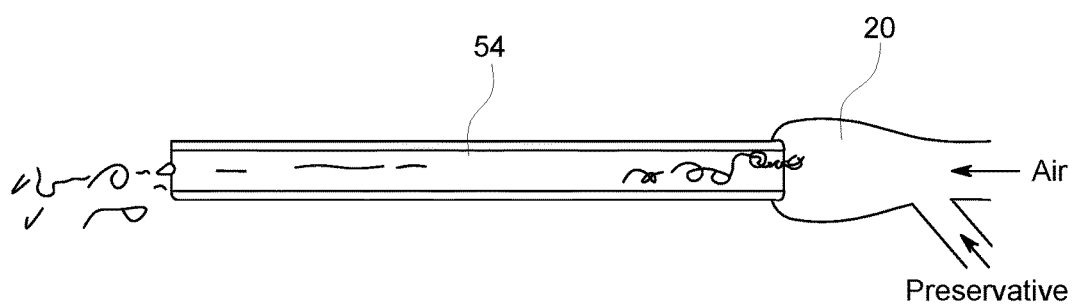
FIG. 4 is a cross-sectional illustration of a preservative injection process.

As best shown in FIG. 2, in use, an operator can position the backpack 50 on his/her back and simply walk over to a row of tubes 54. At this point, the operator may hold the preservative injection nozzle 20 in association or engagement with the exposed end of a tube 54 and depress the trigger to inject the preservative from reservoir 16 into the tube. FIG. 4 is an enlarged, schematic illustration showing the preservative injection process. Once the preservative injection process is complete, as apparent from preservative exiting the distal end of the tube 54, the nozzle 20 may be holstered so that the capping process can be commenced. In particular, the operator may then grasp the cap insertion nozzle 22, position it adjacent to the exposed tube end, and depress the trigger to insert a cap 28 onto the tube end via pneumatic, mechanical or electrical power, depending on system configuration. Finally, the operator may heat shrink the cap to the tube 54 using the heater nozzle 34, before moving on to the next adjacent tube 54 and repeating the process.

Figure 5:
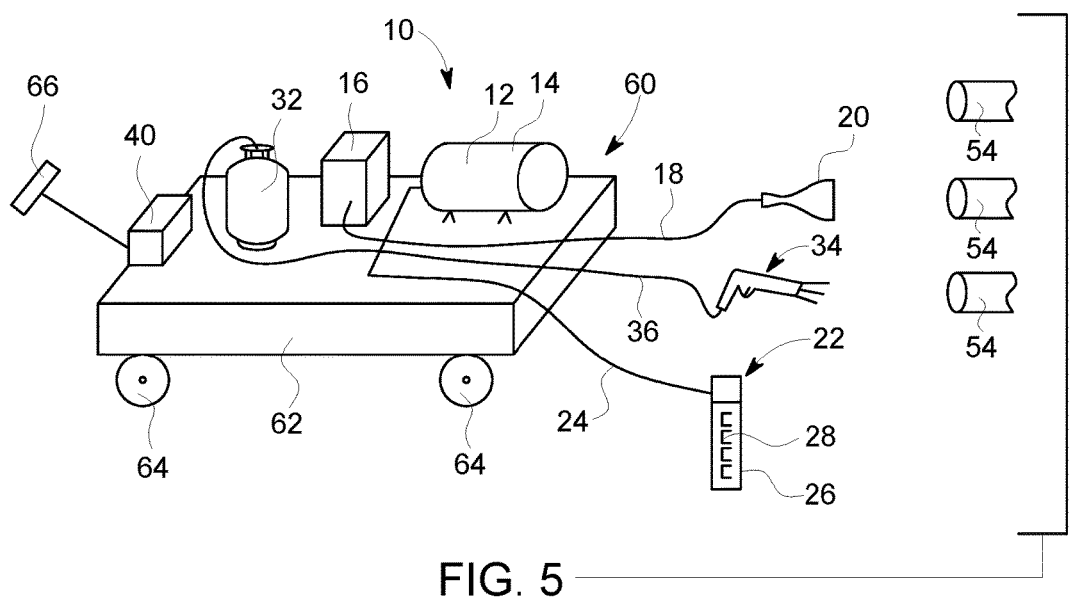
FIG. 5 is a perspective view of the system of FIG. 1, embodied in a wheeled cart.

Referring now to FIG. 5, in another embodiment the system 10 may be integrated into a portable cart 60. As illustrated therein, the cart may include a platform 62 (or a cabinet or housing) supported on a plurality of wheels or casters 64. The cart 60 may be motorized or can include a handle 66 for manually towing or positioning the cart 60 adjacent to a plurality of tubes 54 to be preserved and capped. The platform 62 supports each of the system components described above in connection with FIG. 1, including the battery 40, fuel tank 32 for the heat shrink subsystem, preservative storage reservoir 16, and integrated air compressor 12 and storage tank 14. In an embodiment, these components may be bolted or otherwise secured to the platform 62 to prevent shifting during movement of the cart 60. While FIG. 5 illustrates an on-board compressor 12, as discussed above, it is envisioned that compressed air may be supplied to the cart 60 from an off-board air supply, such as a factory airline, for direct use or for storage in tank 14.

Similar to the wearable backpack 50, in use, the cart 60 may be wheeled adjacent to a row of tubes 54, where an operator may use the three nozzles 20, 22, 34 (or a single, multi-function nozzle) to execute the preservative injection, capping, and cap sealing steps hereinbefore described.

Figure 6:
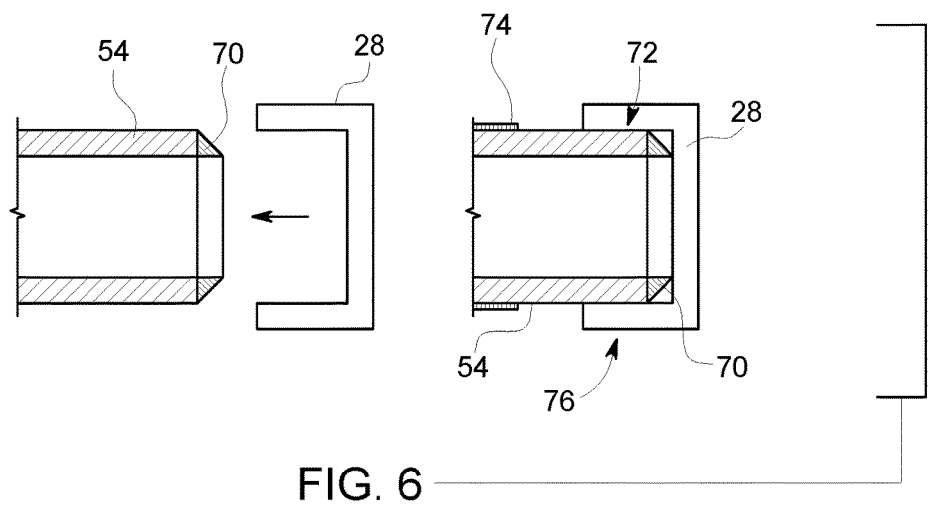
FIG. 6 is a schematic illustration of a capping operation, according to an embodiment of the invention.
Figure 7:
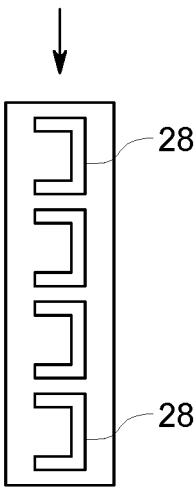
FIG. 7 is a perspective illustration of a cap clip of a capping device, according to an embodiment of the invention.
Figure 8:
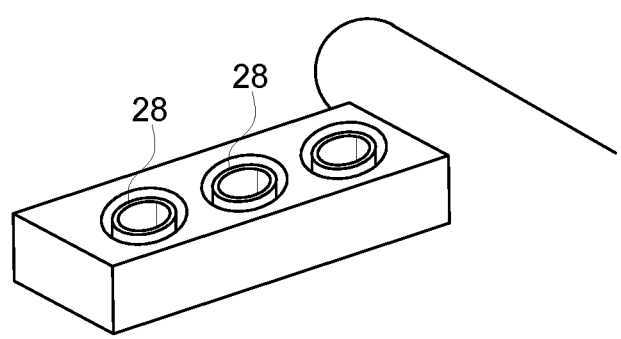
FIG. 8 is a perspective illustration of a cap magazine of a capping device, according to an embodiment of the invention.

Turning now to FIGS. 6-10, two methods for inserting the end cap onto the machined end of a tube are shown. As illustrated in FIG. 6, in one embodiment, the caps may be preformed caps 28 that are sized and shaped so as to closely be received on the prepared end 70 of a tube 54. In particular, the cap 28 may be inserted onto the prepared end 70 of the tube 54 using a pneumatic, electrical, or mechanical piston, as hereinbefore described. As shown in FIG. 6, once the cap is inserted onto the end of the tube 54, it covers the weld preparation 70, as well as a cleaned surface portion 72 beyond the weld preparation 70 (adjacent to a painted portion 74). The sidewalls of the cap 28 are heat shrinked to the outside surface of the tube 54, as shown at 76. As illustrated in FIGS. 7 and 8, the caps 28 may be fed to the capping device from a clip 26 or magazine 78, respectively.

Figure 9:
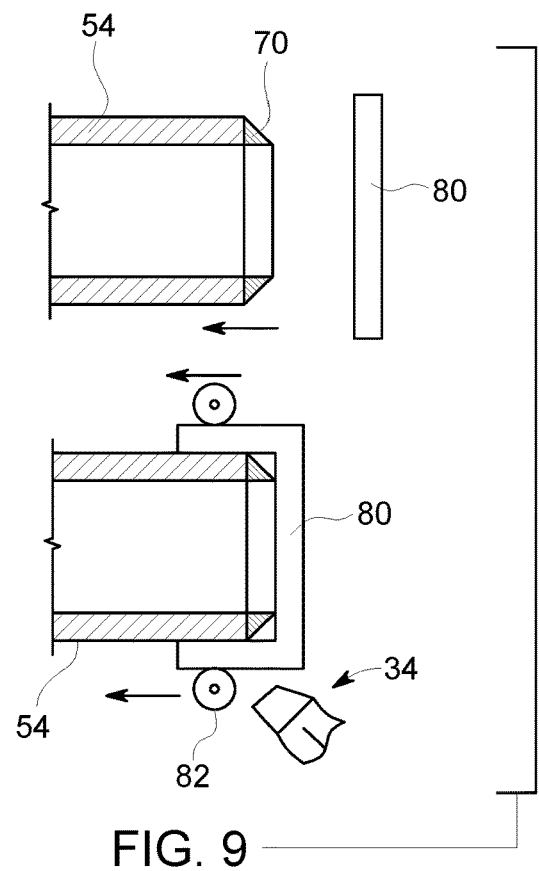
FIG. 9 is a schematic illustration of a capping operation, according to another embodiment of the invention.
Figure 10:
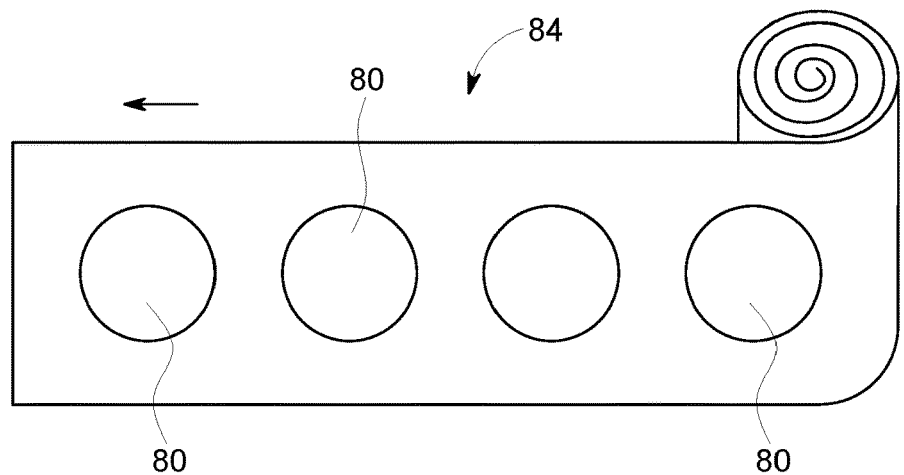
FIG. 10 is a perspective illustration of a perforated cap strip, according to an embodiment of the invention.

As illustrated in FIG. 9, in another embodiment, the caps may be flat discs 80 that are pressed into engagement with the prepared end 70 of a tube 54 and rolled over the outer surface of the tube 54 to cover the weld preparation using rollers 82. For example, the rollers 82 may be integrated with the capping device 22 such that the capping device presses the flat disc 80 onto the end of the tube 54 and rolls the disc 80 over the outer surface of the tube 54 to form the cap in a single, integrated step. The disc 80, now in the form of a cap, may then be heat shrinked to the outside surface of the tube in the manner discussed above. In another embodiment, the rollers 82 themselves may be heated so that the disc 80 is heat shrinked to the tube 54 at the same time it is rolled to shape. For example, the rollers 82 may contain or be conductively coupled to a resistive heating element connected to the battery 40 or other power source. As illustrated in FIG. 10, the discs 80 may be fed to the capping device 22 from a feed strip 84 on which the discs 80 are retained. In an embodiment, the discs 80 are perforated so that they may be pressed form the strip 84 via the piston of the capping device 22.

Figure 11:
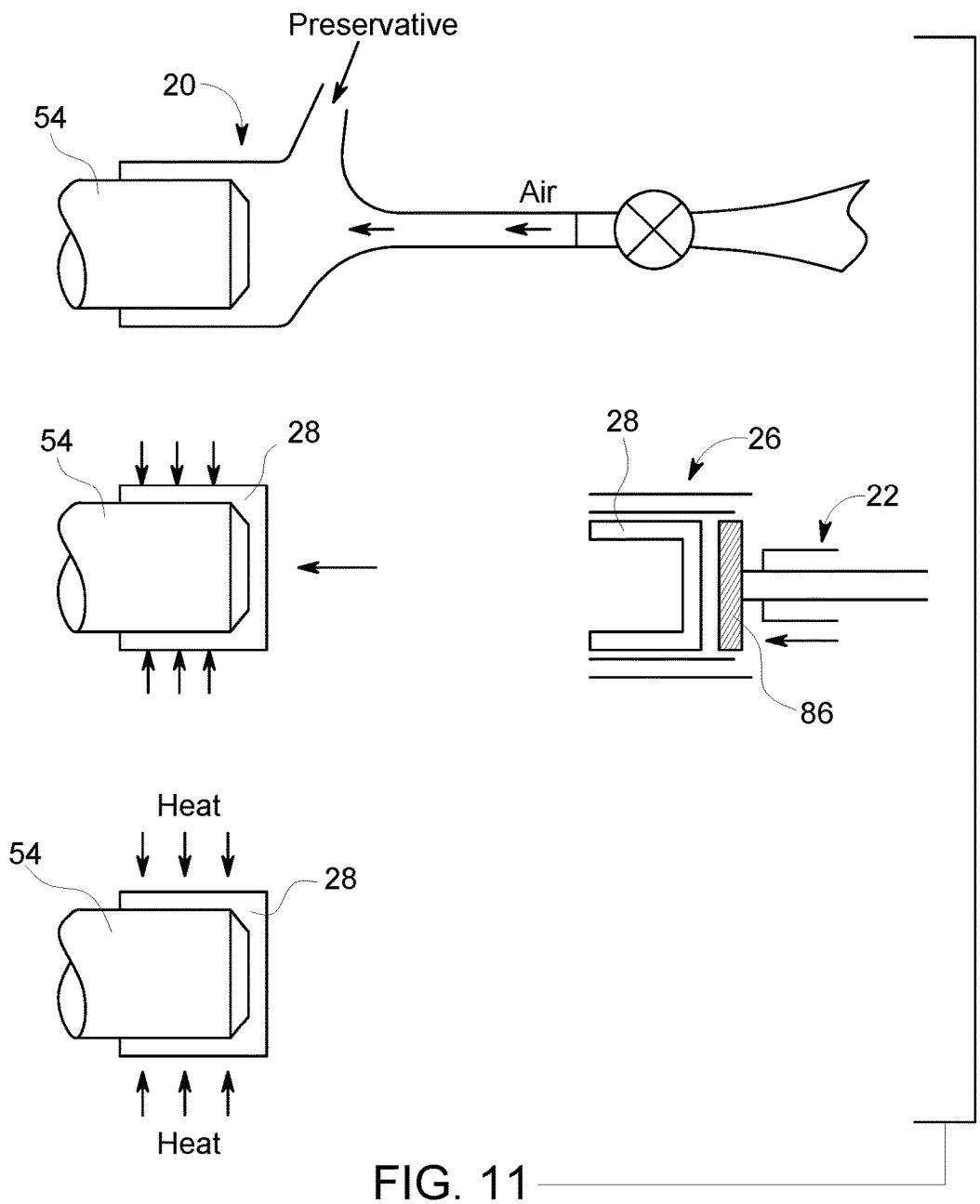
FIG. 11 is a process flow diagram carried out using the system of FIG. 1.

Referring finally to FIG. 11, a process flow diagram illustrating operation of the integrated tube preservation and capping system 10 is shown. As discussed above, a preservative powder entrained in compressed air is injected into the open end of a tube 54 utilizing nozzle 20. After preserving the interior of the tube 54, the capping device 22 is brought into association with the end of the tube 54 and a trigger is actuated to extend a piston 86. The piston 86 inserts a cap from a magazine 26 (or clip or perforated strip) onto the end of the tube. Finally, heat is applied to the cap 28 in order to heat shrink the cap 28 to the outer surface of the tube 54. The tubes may then be painted and shipped for ultimate assembly into boiler tube arrangements and incorporation into various power generation systems and processes.

As indicated above, the invention provides a portable, multi-function system and apparatus that can be utilized to quickly, easily and precisely inject a corrosion inhibitor into the interior of a tube, insert a cap onto the end of the tube, and seal the cap to the tube. In contrast to existing systems and methods, painting the end weld preparation with deoxyaluminate paint is eliminated. This eliminates the possibility that the paint will interfere with the welding process, increasing the likelihood of a defect-free weld. Moreover, by heat shrinking the cap on the end of the tube prior to painting for shipment and long term field storage, the weld preparation is protected from the elements during transport and on-site storage. In particular, the shrinkable cap covers the machined end preparation as well as part of the outer tube surface beyond the weld preparation. When the sealed cap is ultimately removed prior to welding to form a completed boiler tube assembly, a fresh, clean, unpainted weld preparation surface will be exposed, obviating the need for any grinding.

As will be readily appreciated, the system, method and apparatus of the invention provides a level of automation heretofore not seen in the art, and eliminates the tedious, manual steps required with existing tube preservation and capping processes.

In an embodiment, a system for preserving and capping tubes is provided. The system includes a compressed air reservoir for storing compressed air, a preservative reservoir containing a supply of a preservative, a nozzle in fluid communication with the compressed air reservoir and the preservative reservoir for injecting the preservative into the interior of a tube, and a capping device configured to insert a cap onto the end of the tube. In an embodiment, the capping device is in fluid communication with the compressed air reservoir and includes a pneumatic piston for inserting the cap onto the end of the tube. In an embodiment, the capping device includes one of a mechanically driven piston and en electrically driven piston. In an embodiment, the system also includes a heating device for heat shrinking the cap to the tube. In an embodiment, the heating device may include fuel storage tank containing a supply of combustible fuel. In an embodiment, the system is integrated into a wearable backpack. In an embodiment, the system is integrated into a wheeled cart. In an embodiment, the system may also include an air compressor configured to supply the compressed air reservoir with the compressed air. In an embodiment, the system may include a battery electrically connected to the air compressor for powering the air compressor. In an embodiment, the system may include a connector fluidly connected to the compressed air reservoir, the connector being configured for coupling with an external supply of compressed air for storage in the compressed air reservoir.

In another embodiment, an apparatus for preserving and capping boiler tubes is provided. The apparatus includes a mechanism for injecting a preservative into an interior of a tube, a mechanism for inserting a cap onto the end of the tube, and a heating device for heat shrinking the cap to an outer surface of the tube. In an embodiment, the mechanism for injecting the preservative into the interior of the tube includes a compressed air reservoir for storing compressed air, a preservative reservoir configured to hold the preservative, and a nozzle fluidly connected to the compressed air reservoir and the preservative reservoir. In an embodiment, the mechanism for inserting the cap onto the end of the tube includes a pneumatic piston driven by the compressed air from the compressed air reservoir. In an embodiment, the heating device includes a fuel storage tank containing a supply of combustible fuel, such as propane. In an embodiment, the apparatus is integrated into a wearable backpack. In an embodiment, the apparatus is integrated into a wheeled cart.

In yet another embodiment, a method for preserving and capping a tube is provided. The method includes the steps of placing a preservative injection nozzle in close association with an end of a tube, entraining a preservative with a supply of compressed air and injecting the preservative into the interior of the tube through the nozzle, arranging a capping device in close association with the end of the tube, pressing a cap onto the end of the tube with the capping device, and applying heat to the cap to heat shrink the cap to the outer surface of the tube. In an embodiment, pressing the cap onto the end of the tube includes separating a flat disc from a perforated sheet and rolling the flat disc onto the end of the tube. In an embodiment, the steps of injecting the preservative, pressing the cap onto the end of the tube and applying heat to the cap are carried out with an integrated, portable apparatus.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system for preserving and capping tubes, comprising:
a compressed air reservoir for storing compressed air;
a preservative reservoir containing a supply of a preservative;
a nozzle in fluid communication with the compressed air reservoir and the preservative reservoir for injecting the preservative into the interior of a tube; and
a capping device configured to insert a cap onto the end of the tube.

2. The system of claim 1, wherein:
the capping device is in fluid communication with the compressed air reservoir and includes a pneumatic piston for inserting the cap onto the end of the tube.

3. The system of claim 2, further comprising:
a heating device for heat shrinking the cap to the tube.

4. The system of claim 3, wherein:
the heating device includes a fuel storage tank containing a supply of combustible fuel.

5. The system of claim 3, wherein:
the system is integrated into a wearable backpack.

6. The system of claim 3, wherein:
the system is integrated into a wheeled cart.

7. The system of claim 1, wherein:
the capping device includes one of a mechanically driven piston and en electrically driven piston.

8. The system of claim 1, further comprising:
an air compressor configured to supply the compressed air reservoir with the compressed air.

9. The system of claim 8, further comprising:
a battery electrically connected to the air compressor for powering the air compressor.

10. The system of claim 1, further comprising:
a connector fluidly connected to the compressed air reservoir, the connector being configured for coupling with an external supply of compressed air for storage in the compressed air reservoir.

11. An apparatus for preserving and capping boiler tubes, comprising:
a mechanism for injecting a preservative into an interior of a tube;
a mechanism for inserting a cap onto the end of the tube; and
a heating device for heat shrinking the cap to an outer surface of the tube.

12. The apparatus of claim 11, wherein:
the mechanism for injecting the preservative into the interior of the tube includes a compressed air reservoir for storing compressed air, a preservative reservoir configured to hold the preservative, and a nozzle fluidly connected to the compressed air reservoir and the preservative reservoir.

13. The apparatus of claim 12, wherein:
the mechanism for inserting the cap onto the end of the tube includes a pneumatic piston driven by the compressed air from the compressed air reservoir.

14. The apparatus of claim 13, wherein:
the heating device includes a fuel storage tank containing a supply of combustible fuel.

15. The apparatus of claim 14, wherein:
the fuel is propane.

16. The apparatus of claim 11, wherein:
the apparatus is integrated into a wearable backpack.

17. The apparatus of claim 1, wherein:
the apparatus is integrated into a wheeled cart.

* * * * *